United States Patent
Kralik et al.

(10) Patent No.: US 7,076,278 B2
(45) Date of Patent: Jul. 11, 2006

(54) HYBRID TELEPHONY DEVICE

(75) Inventors: James Kralik, Shanghai (CN); Gary Rogalski, Richmond (CA)

(73) Assignee: VTech Telecommunications Limited, Tai Po (HK)

( * ) Notice: Subject to any disclaimer, the term of this patent is extended or adjusted under 35 U.S.C. 154(b) by 430 days.

(21) Appl. No.: 10/401,795

(22) Filed: Mar. 31, 2003

(65) Prior Publication Data

US 2004/0192410 A1 Sep. 30, 2004

(51) Int. Cl.
*H04B 1/38* (2006.01)
*H04M 1/00* (2006.01)
*H04M 11/00* (2006.01)

(52) U.S. Cl. .................. 455/573; 455/403; 455/561; 455/572

(58) Field of Classification Search .............. 455/562.1, 455/572, 573, 423, 574, 522, 561; 379/93.14
See application file for complete search history.

(56) References Cited

U.S. PATENT DOCUMENTS

| | | | |
|---|---|---|---|
| 5,133,005 A * | 7/1992 | Kelley et al. ............... | 379/146 |
| 5,805,998 A | 9/1998 | Kodama | |
| 5,982,862 A | 11/1999 | Bradley et al. | |
| 6,041,240 A * | 3/2000 | McCarthy et al. .......... | 455/464 |
| 6,078,821 A * | 6/2000 | Kaschke et al. ............ | 455/507 |
| 6,490,458 B1 * | 12/2002 | Campbell .................... | 455/463 |
| 2002/0076038 A1 * | 6/2002 | Barrese et al. .............. | 379/413 |
| 2002/0147009 A1 * | 10/2002 | Kocheisen .................. | 455/426 |
| 2003/0059035 A1 * | 3/2003 | Nebiker et al. ........ | 379/399.01 |

FOREIGN PATENT DOCUMENTS

| | | |
|---|---|---|
| EP | 0 343 966 | 5/1989 |
| EP | 0 405 714 | 1/1991 |
| EP | 0405714 A3 * | 2/1991 |
| JP | 3186053 | 8/1991 |
| JP | 5191488 | 7/1993 |

OTHER PUBLICATIONS

GB Search Report dated May 28, 2004.

* cited by examiner

*Primary Examiner*—Curtis Kuntz
*Assistant Examiner*—Michael T. Thier
(74) *Attorney, Agent, or Firm*—Pillsbury Winthrop Shaw Pittman LLP

(57) ABSTRACT

A device configured to draw current from one of a PSTN source and a battery source depending on a mode of operation of the device is disclosed. In a preferred embodiment, the device includes a circuit that is configured to draw current from the PSTN source during a first condition and from the battery source during a second condition. Preferably, the circuit is defaulted to draw current from the battery source. The first condition can be associated with an off-hook condition. The second condition can be associated with an on-hook condition.

18 Claims, 3 Drawing Sheets

HYBRID TELEPHONY DEVICE

BACKGROUND

1. Field of the Invention

The present invention relates generally to a telephony device and, more particularly, to a telephony device that uses powers from two or more sources.

2. Background of the Invention

Conventional telephones includes those that are line (PSTN) powered. Line powered telephones usually offer only very basic functionality as there are very stringent limits imposed by regulatory authorities on the amount of current that can be drawn off the PSTN line both for on-hook and off-hook conditions. For example, during an on-hook condition, the telephone must represent an impedance of greater than 5 M$\Omega$ (5,000,000 Ohms). With on-hook voltages as low as 25 V (or possibly lower than 25 V depending on the central office, loop length, and other factors), this represents a maximum current draw of less than 5 $\mu$A (5 micro amps). A typical radio transceiver device, e.g., a cordless telephone, operating in standby mode would have a peak current draw many time greater than this, thereby precluding the possibility of any type of radio communication while the device is on-hook. This is clearly an unacceptable functional limitation as any cordless telephony device must be able to respond to radio communication initiated by the cordless handset prior to the base device going off-hook.

Most cordless telephones today have advanced functions that require the base unit to be connected to a PSTN line and an external power source to enable proper operation of the advanced functions. The need for the external power source, e.g., AC power outlet, is associated with a number of disadvantages. First, a power adapter that is cumbersome and esthetically unappealing is required. Second, the telephone must be placed at a location where the PSTN line and the AC power outlet are co-located. Third, the telephone ceases to operate during power failure events.

Therefore, users have to choose between a line-powered corded telephone that offers very simple functionality with no external power required and a more fully featured device that utilizes an external power connection. There is not any telephony device in the market that provides full functionality without requiring an external power connection.

SUMMARY OF THE INVENTION

The invention provides a telephony device that provides more functionality than a conventional line-powered telephone without requiring an AC power source. The preferred embodiments of the invention includes a mechanism that allows a telephony device to be powered by the PSTN line directly and augmented through the use of batteries.

A preferred embodiment of the invention provides a device that includes a circuit configured to draw current from a PSTN source during a first condition and from a battery source during a second condition. Preferably, the circuit is defaulted to draw current from the battery source. The first condition can be associated with an off-hook condition. The second condition can be associated with an on-hook condition. Preferably, the device further includes a base unit and a handset, and the battery source is located at the base unit. The base unit and the handset maintains a periodic radio communication during the second condition.

Another preferred embodiment of the invention provides a telephone that includes a base unit, a battery, and a microcontroller. The base unit is configured to communicate with a PSTN. The battery is housed within the base unit. The microcontroller is housed within the base unit, and it is configured to generate a first signal during an off-hook condition and a second signal during an on-hook condition. The first signal results in current being drawn exclusively from the PSTN and the second signal results in current being drawn exclusively from the battery. Preferably, the first signal is a high control signal and the second signal is a low control signal. Preferably, the battery includes a primary battery cell. For example, the battery includes an alkaline battery cell. Alternatively or in addition to the primary battery cell, the battery can include a rechargeable battery cell. Preferably, the telephone further includes a battery charger that is housed within the based unit. The battery charger is configured to draw current from the PSTN to recharge the rechargeable battery cell.

Another preferred embodiment of the invention provides a cordless telephone that includes a base unit, a battery source housed within the base unit, a handset configured to communicate with the base unit using radio communication, and a microcontroller housed within the base unit. The microcontroller is configured to generate a control signal that is either high or low depending on a mode of operation of the device. The cordless telephone further includes means for drawing current from one of the PSTN source and the battery source depending on whether the control signal is high or low. Preferably, the current is drawn from the PSTN source when the control signal is high and the current is drawn from the battery source when the control signal is low. Preferably, a low control signal is associated with a mode of operation that does not involve a radio communication between the base unit and the handset, and a high control signal is associated with a mode of operation that involves a radio communication between the base unit and the handset.

Another preferred embodiment of the invention provides a method that includes the following steps. A device is defaulted to draw current from a battery source. A mode of operation of the device is monitored. If the mode of operation involves an on-hook condition, then current is continued to be drawn from the battery source. If the mode of operation involves an off-hook condition, then current is drawn from a PSTN source. Preferably, the method further includes generating a control signal that is either high or low depending on the mode of operation. For example, the current is drawn from the PSTN source when the control signal is high and from the battery source when the control signal is low. Preferably, the method further include recharging the battery source with current drawn from the PSTN source.

DETAILED DESCRIPTION OF THE INVENTION

As disclosed herein, telephony devices of the invention include any apparatus that can be used to initiate or receive a telephone call, or is otherwise configured to utilize the PSTN for voice and data communication. For example, the telephony devices include telephone sets (conventional corded and cordless telephones) as well as computers that are equipped to communicate via the PSTN or other telephone networks. An exemplary telephony device of the invention is described below as a cordless telephone.

Figure 1:
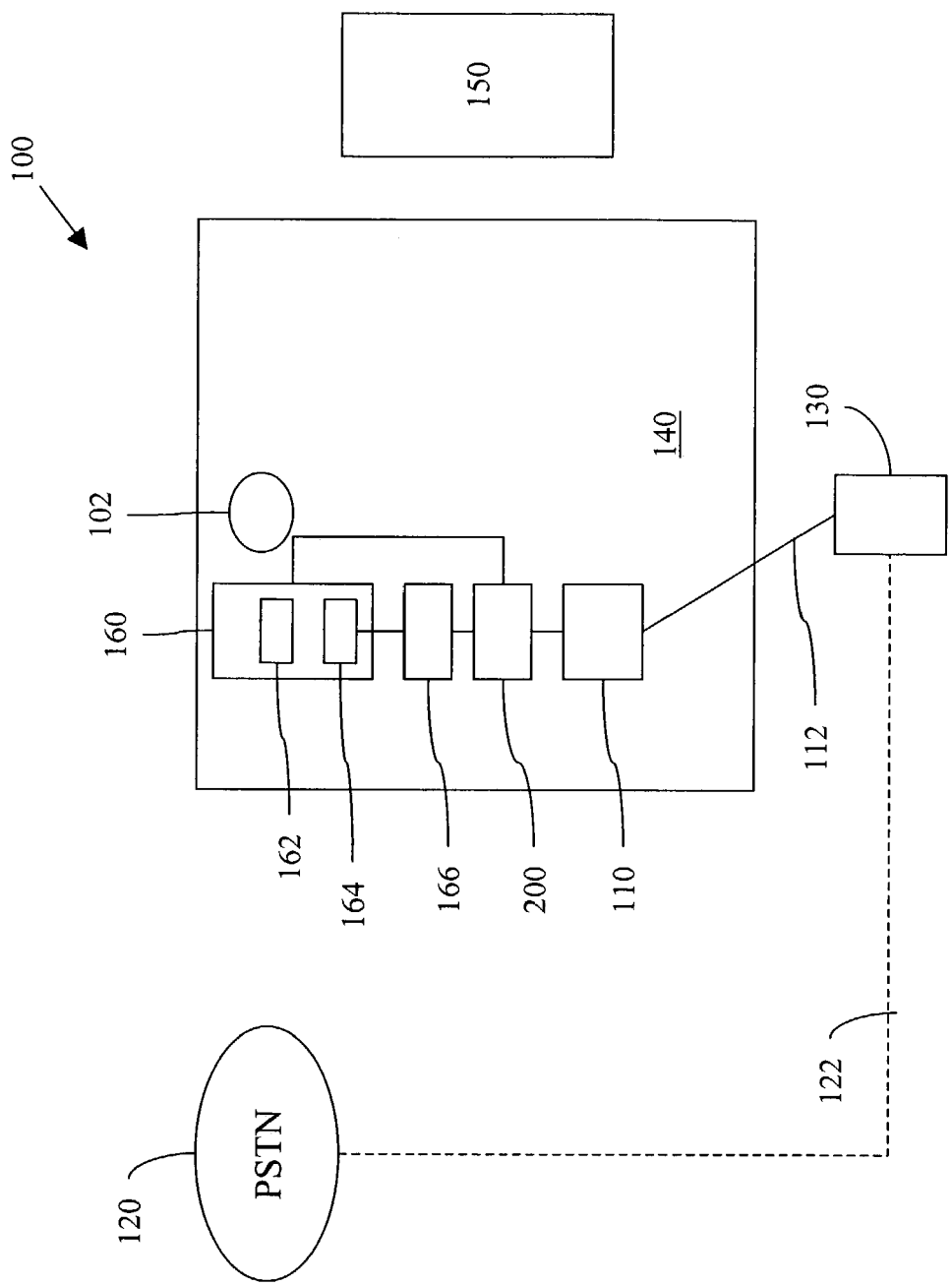
FIG. 1 is a schematic diagram showing an exemplary layout of a telephony device of the invention.

FIG. 1 is a schematic diagram showing the layout of an exemplary telephony device of the invention. Although device 100 is described herein as a cordless telephone, it is noted that device 100 can be another telephony device on which the present invention can be implemented.

Phone jack 110 of device 100 is connected to wall outlet 130 by telephone cord 112. Through wall outlet 130, device 100 communications with PSTN 120 via telephone line 122. As known in the art, PSTN 120 supplies device 100 with telephone signals as well as an electrical current. The electrical current can be used to power basic components of device 100 including, for example, ringer 102 of device 100. The current is insufficient, however, to support more advanced functions including, for example, radio communication between base unit 140 and handset 150. Handset 150 has its own battery source as known in the art.

Battery 160 is configured to supply a current when no power can be drawn from PSTN 120. The current supplied by battery 160 is sufficient to support the more advanced functions of device 100. For example, battery 160 is used to power radio communication between base unit 140 and handset 150 during an on-hook operation mode of device 100. Battery 160 can include primary or secondary batteries, or both.

In the preferred embodiment of the invention, battery 160 includes primary battery cells 162. Preferably, battery cells 162 are high capacity alkaline cells. For example, typical "C" and "D" batteries may be used. In alternative embodiments, other battery cells may be used. For example, rechargeable cells 164 may be included in battery 160 in an alternative embodiment. In this alternative embodiment, excess current available from the PSTN line (not required by the base circuitry) could be redirected to slowly charge the rechargeable cells 164 while the system is off-hook. Recharging can be performed by, for example, battery charger 166 that is in communication with rechargeable cells 164. Depending on regulations, the total current drawn off the PSTN line does not exceed the maximum allowed by the regulating agency (e.g., the FCC in the United States). Preferably, the rechargeable cells 164 are supplied with device 100 in a fully charged condition.

A preferred embodiment of device 100 has the following exemplary characteristics:

It is powered by PSTN 120 but is augmented by power from battery 160;

It has the ability to receive power from battery 160 during an on-hook condition and from PSTN 120 automatically when it enters an off-hook condition;

It has the ability to supplement PSTN 120 power with battery 160 power in the event that device 100 current requirements exceed what can be drawn from PSTN 120 while off-hook;

It provides enhanced telephony functions (e.g., cordless operation) without requiring an AC power connection;

It does not experience interruption in operation in the event of an AC power failure; and It utilizes battery 160 only during on-hook conditions where the current consumption is least, thereby maximizing the life of the batteries (e.g., 6 months or longer).

Figure 2:
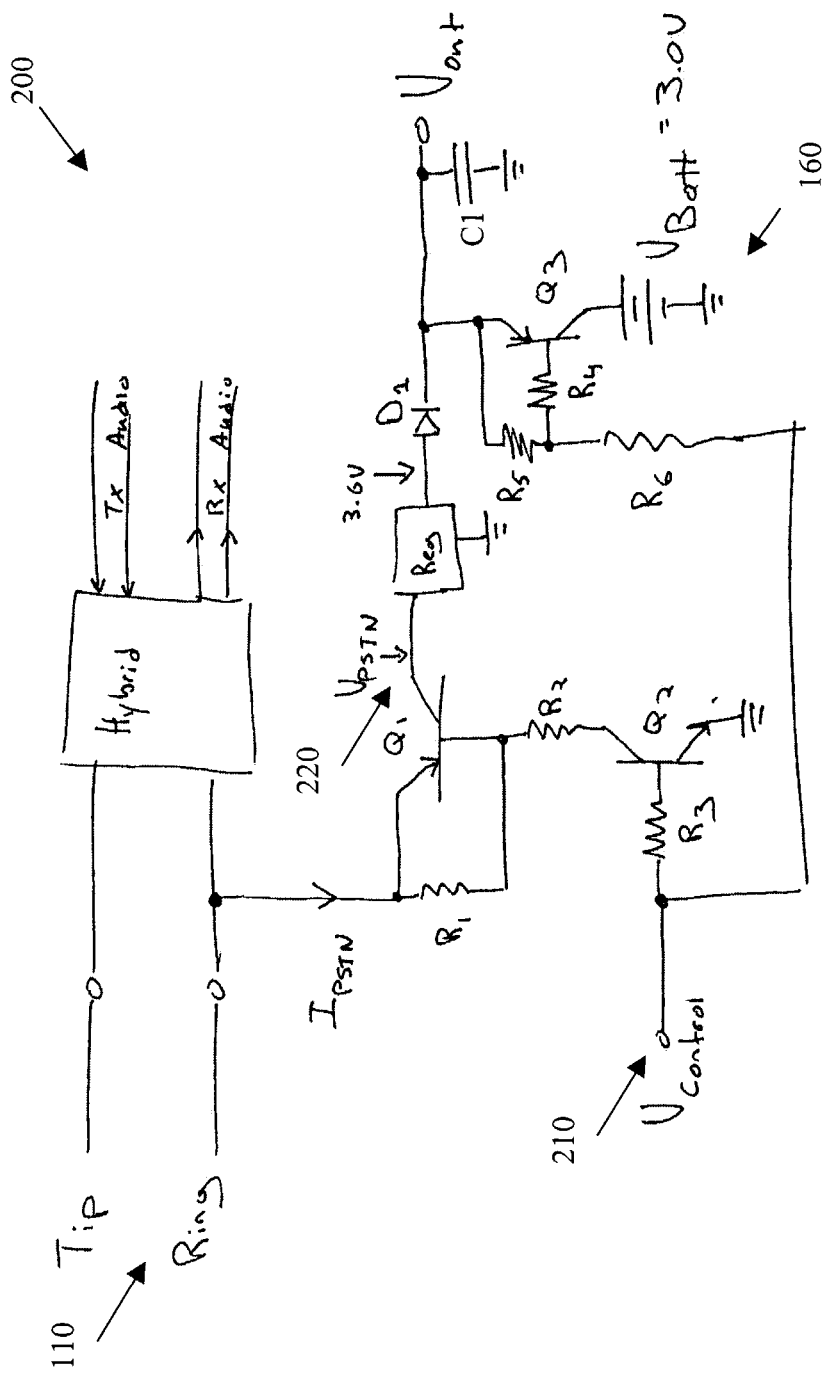
FIG. 2 is an exemplary power source switch control circuit that can be used to implement a telephony device of the invention.

Device 100 includes circuit 200. An exemplary circuit 200 is depicted in FIG. 2. Battery 160 and phone jack 110 are in communication with circuit 200. Circuit 200 is configured to switch between PSTN power (drawn from PSTN 120 via phone jack 110) and battery power (drawn from battery 160). Circuit 200 also allows battery 160 to supplement the current that can be drawn off PSTN 120 in modes of operation where the amount of current required by base unit 140 is greater than the maximum that can be drawn off PSTN 120 alone.

Circuit 200 operates basically as a switch drawing power either from PSTN 120 or from battery 160. Although it is possible to receive current from battery 160 to supplement current from PSTN 120, circuit 200 shown in FIG. 2 does not support that function. Circuit 200 is configured to function in a way that when device 100 is off hook and requiring the most current (i.e., radio transmitting and receiving continuously), circuit 200 disconnects battery 160 and draws power from PSTN 120 only. Battery 160 is only used to supply power during an on-hook condition when the amount of current that the FCC allows device 100 to draw off the PSTN connection is too low to power the circuit at all.

Circuit 200 is in communication with microcontroller 210. Microcontroller 210 produces a control signal. The control signal is preferably digital in nature. The control signal can be high or low, which determines whether the power is taken from the PSTN source or from the battery source. A high control signal can be associated with an off-hook condition. A low control signal can be associated with an on-hook condition. In one specific embodiment as shown in circuit 200, the high control signal can be associated with a situation in which cordless handset 150 is being used during a communication session via PSTN 120, and the low control signal can be associated with a radio communication between handset 150 and base unit 140 during an on-hook condition.

In a preferred embodiment, if the control signal is high, current flows through R3 and Q2 is turned on. Base bias is allowed to flow through R2 and Q1 turns on. With Q1 on, the voltage of the PSTN source ($V_{PSTN}$) is applied to the input of voltage regulator 220 and the 3.6 V output from voltage regulator 220 flows through D1 and supplies about 3 VDC to $V_{out}$ to power the base circuitry. In this state, Q3 is off and the voltage of the batter source ($V_{Batt}$) is isolated from $V_{out}$.

If the control signal is low, Q2 is off, Q1 is also off, and $V_{PSTN}$ is not applied to the input of voltage regulator 220 and the combined impedance presented to the PSTN line must be more than about 5 MΩ. Likewise, with the control signal low, Q3 is turned on by virtue of current now being allowed to flow through R4 and R6. With Q3 on, $V_{Batt}$ is connected to V out and will be isolated from the output of voltage regulator 220 by D1.

C1 holds the output voltage at about 3 VDC for a short period of time to allow circuit 200 to function normally during the transition between PSTN power and battery power as the operation of $V_{control}$ depends on $V_{out}$ having 3 VDC present. The maximum current drawn off $I_{PSTN}$ is less than 30 mA as many central office switches are now limiting the loop current to a maximum of 30 mA. $V_{out}$ is what powers the rest of base unit 140. Preferably, C1 is positioned such that it can smooth out any supply voltage transients that could result from switching between power sources.

Figure 3:
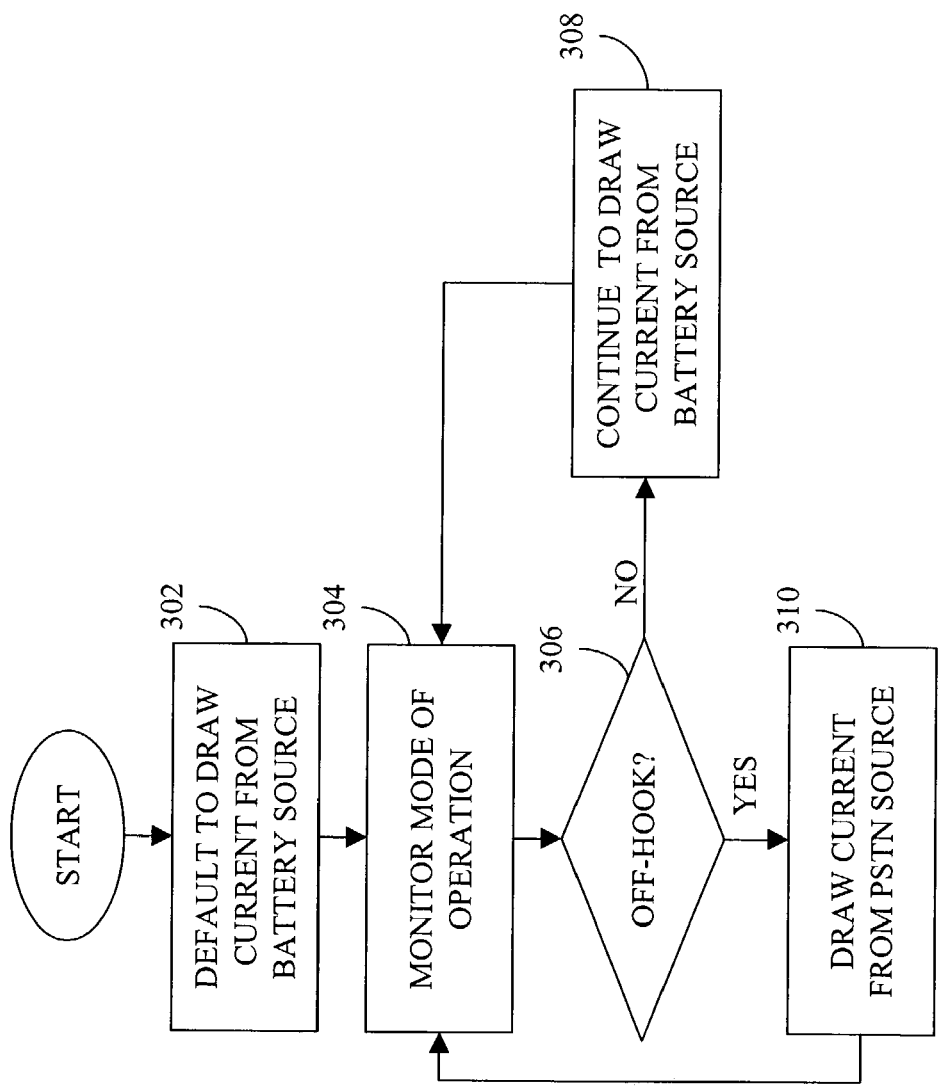
FIG. 3 is a flowchart showing exemplary steps involved in a preferred embodiment of the invention.

FIG. 3 is a flowchart showing exemplary steps involved in a preferred embodiment of the invention.

In step 302, base unit of device 100 is defaulted to draw current from battery 160. This default ensures that a radio communication between handset 150 and base unit 140 can be maintained during an on-hook condition.

In step 304, device 100 monitors the mode of operation. For example, device 100 is configured to determine whether it is in an on-hook condition or an off-hook condition.

In step 306, if an outside stimulus is detected, the process goes to step 310. Otherwise, the process goes to step 308. The outside stimulus can occur when, for example, handset 150 communicates its intent to dial or there is an incoming ringing on the PSTN line. As known in the art, a microprocessor of device 100 controls all functions of device 100. The microprocessor first senses the change in condition, initiates the off-hook condition, and then initiates the change in power source.

In step 308, so long as device 100 remains in an on-hook condition, base unit 140 continues to draw current from battery 160. This can be implemented using microcontroller 210 that generates a low signal so that current is drawing from battery 160 as shown in FIG. 2 and described above. The process then returns to step 304.

In step 310, when device 100 enters an off-hook condition, e.g., a communication session has been established with PSTN 120, current is drawn from PSTN 120 in stead of from battery 160. As shown in FIG. 2 and described above, this can be implemented by microcontroller 210, which generates a high control signal so that circuit 200 draws current from PSTN 120.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A telephone device comprising:
a cordless telephone base station; and
a circuit housed within the base station and configured to draw current from a PSTN source during an off-hook condition and exclusively from a battery source during an on-hook condition, wherein the battery source is configured to supplement current drawn from the PSTN during the off-hook condition.

2. The device of claim 1, wherein the circuit is defaulted to draw current from the battery source.

3. The device of claim 1, further comprising a cordless-handset in radio communication with the base unit.

4. The device of claim 3, wherein the base unit and the handset maintains a periodic radio communication during the on-hook condition.

5. A cordless telephone comprising:
a base unit configured to communicate with a PSTN;
a battery housed within the base unit; and
a microcontroller housed within the base unit, wherein the microcontroller is configured to generate a first signal during an off-hook condition and a second signal during an on-hook condition,
wherein the first signal results in current being drawn exclusively from the PSTN and the second signal results in current being drawn exclusively from the battery,
wherein the battery is configured to supplement current drawn from the PSTN during the off-hook condition, when current requirements of the cordless telephone exceed what current can be drawn from the PSTN source.

6. The cordless telephone of claim 5, wherein the first signal is a high control signal and the second signal is a low control signal.

7. The cordless telephone of claim 5, wherein the battery includes a primary battery cell.

8. The cordless telephone of claim 5, wherein the battery includes an alkaline battery cell.

9. The cordless telephone of claim 5, wherein the battery includes a rechargeable battery cell.

10. The cordless telephone of claim 9, further comprising a battery charger housed within the based unit, wherein the battery charger is configured to draw current from the PSTN to recharge the rechargeable battery cell.

11. A cordless telephone comprising:
a base unit configured to draw current from a PSTN source;
a battery source housed within the base unit;
a handset configured to communicate with the base unit using radio communication;
a microcontroller housed within the base unit, wherein the microcontroller is configured to generate a control signal that is either high or low depending on a mode of operation of the device;
means for drawing current exclusively from the PSTN source during a first mode of operation of the device; and
means for supplementing the current drawn from the PSTN source with the battery source during a second mode of operation of the device.

12. The cordless telephone of claim 11, wherein the current is drawn from at least the PSTN source when the control signal is high and the current is drawn exclusively from the battery source when the control signal is low.

13. The cordless telephone of claim 11, wherein a low control signal is associated with a mode of operation that involves a radio communication between the base unit and the handset.

14. The cordless telephone of claim 11, wherein a high control signal is associated with a mode of operation that does not involve a radio communication between the base unit and the handset.

15. A method comprising:
defaulting a device to draw current from a battery source;
monitoring a mode of operation of the device;
continuing to draw current from the battery source if the mode of operation involves an on-hook condition;
drawing current exclusively from a PSTN source when the mode of operation involves an off-hook condition; and
supplementing the current drawn from the PSTN source with the battery source during the off-hook condition, when current requirements of the device exceed what current can be drawn from the PSTN source.

16. The method of claim 15, further comprising generating a control signal that is either high or low depending on the mode of operation.

17. The method of claim 16, wherein the current is drawn from the PSTN source when the control signal is high and from the battery source when the control signal is low.

18. The method of claim 15, further comprising recharging the battery source with current drawn from the PSTN source.

* * * * *